United States Patent
Melanson

(10) Patent No.: US 7,835,772 B2
(45) Date of Patent: Nov. 16, 2010

(54) FM OUTPUT PORTABLE MUSIC PLAYER WITH RDS CAPABILITY

(75) Inventor: John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 907 days.

(21) Appl. No.: 11/644,597

(22) Filed: Dec. 22, 2006

(65) Prior Publication Data

US 2008/0153418 A1    Jun. 26, 2008

(51) Int. Cl.
*H04M 1/00*    (2006.01)
(52) U.S. Cl. ............ 455/569.1; 455/90; 455/436; 455/351; 375/354; 381/12
(58) Field of Classification Search .......... 455/569, 455/90, 463, 351, 575, 559; 375/354, 238; 381/12, 183
See application file for complete search history.

(56) References Cited

U.S. PATENT DOCUMENTS

| | | | | |
|---|---|---|---|---|
| 5,257,312 A * | 10/1993 | Therssen et al. | ............... | 381/4 |
| 5,584,063 A * | 12/1996 | Brinkhaus | ............... | 455/266 |
| 5,673,324 A * | 9/1997 | Kasser et al. | ............... | 381/4 |
| 5,717,726 A * | 2/1998 | Herrmann et al. | ........... | 375/350 |
| 5,978,689 A * | 11/1999 | Tuoriniemi et al. | ...... | 455/569.1 |
| 6,094,568 A * | 7/2000 | Kianush et al. | .......... | 455/161.1 |
| 6,452,919 B1 * | 9/2002 | Wietzke et al. | ............ | 370/343 |
| 6,470,178 B1 * | 10/2002 | Cummings-Hill et al. ........... | | 455/186.1 |
| 6,477,459 B1 * | 11/2002 | Wunderlich | ............... | 701/209 |
| 6,661,292 B2 * | 12/2003 | Gierl et al. | ............... | 331/1 A |
| 6,961,548 B2 * | 11/2005 | Groeger et al. | ........... | 455/161.1 |
| 7,149,312 B1 * | 12/2006 | Wildhagen | ............... | 381/2 |
| 7,551,889 B2 * | 6/2009 | Quelle | ............... | 455/3.06 |
| 7,587,170 B1 * | 9/2009 | Lee et al. | ............... | 455/45 |
| 2002/0140515 A1 * | 10/2002 | Gierl et al. | ............... | 331/100 |
| 2002/0187751 A1 * | 12/2002 | Gierl et al. | ............... | 455/45 |
| 2003/0087618 A1 * | 5/2003 | Li et al. | ............... | 455/214 |
| 2004/0247133 A1 * | 12/2004 | Gierl et al. | ............... | 381/7 |
| 2006/0280270 A1 * | 12/2006 | Ibrahim et al. | ............... | 375/354 |
| 2007/0061215 A1 * | 3/2007 | Waites | ............... | 705/26 |
| 2008/0232279 A1 * | 9/2008 | Marholev | ............... | 370/280 |
| 2008/0233892 A1 * | 9/2008 | Marholev et al. | ............... | 455/77 |
| 2008/0298456 A1 * | 12/2008 | Haggis et al. | ............... | 375/238 |

* cited by examiner

*Primary Examiner*—Minh D Dao
(74) *Attorney, Agent, or Firm*—Davis Chin; Steven Lin; Gregory S. Thomas

(57) ABSTRACT

A FM output portable audio player is provided for digitally coupling audio signals generated therein to be broadcast through a radio receiver system, such as an automobile radio. The audio player includes an audio signal source for generating digital audio output signals. Digital audio interface circuitry is coupled directly to the digital audio output signals and includes a digital FM stereo/RDS multiplexer for modulating the digital audio output signals on a RF carrier to produce a modulated audio signal. An internal antenna is coupled to the digital FM stereo/RDS multiplexer. The portable audio player is capable of wirelessly transmitting the modulated signal to the radio receiver system. The digital audio interface circuitry is formed of integrated circuit chips which provides for lower cost, a compact size, and a higher audio quality. A radio data signal is also multiplexed by the digital FM stereo/RDS multiplexer to generate the modulated signal having the radio data signal centered about a 57 kHz suppressed carrier.

18 Claims, 2 Drawing Sheets

FM OUTPUT PORTABLE MUSIC PLAYER WITH RDS CAPABILITY

BACKGROUND OF THE INVENTION

1. Field of the Invention

The invention relates generally to wireless audio transmission apparatuses. More particularly, it relates to an improved Frequency Modulation (FM) output portable audio player for digitally coupling audio signals generated therein to be broadcasted through an automobile's radio receiver system.

2. Description of the Prior Art

As is generally known in the art, portable audio players using MP3 or other compression have been very popular to consumers in the digital audio environment. In using of such portable audio players, there are provided suitable controls on the audio player which enables digitally compressed audio sounds, such as music, that have been stored on a memory card to be played through headphones attached thereto by a cable.

While the headphones can be easily used in connection with a number of activities associated with the portable audio players, the use of headphones when driving an automobile has been however generally prohibited by law as creating an unsafe driving condition. As a result, there have been developed heretofore in the prior art portable audio players which can be used in an automobile where the compressed audio sounds converted from the digitally stored music in the audio players are broadcasted through an automobile radio receiver system. One such prior art portable audio player is shown in FIG. 1 and has been labeled as "Prior Art".

As depicted in FIG. 1, there is illustrated in block diagram form a traditional audio system 10, suitable for illustrating one of the prior art systems. In particular, the audio system 10 includes a portable audio player 12, a wireless audio link 14, and a remote audio receiver 16. The portable audio player 12 may be in the form of a CD, MP3, DVD player or the like carrying a digital audio storage media which is capable of generating stereo audio signals. In particular, the MP3 player 12 includes an audio signal source, such as a microprocessor 18, for generating digital audio output signals on lines 20 and 22 and a digital-to-analog (D/A) converter 24 responsive to the digital signals for providing stereo left and right analog outputs on respective conductors 26 and 28.

The wireless audio link 14 is suitably disposed in a cradle housing (not shown) and contains appropriate circuitry which is electrically connected to the analog outputs on the conductors 26 and 28 of the MP3 player 12 for wirelessly transmitting the audio signals on a RF carrier signal to the remote audio receiver system 16. The wireless audio link 14 includes a FM stereo multiplexer 30 and a phase-locked-loop (PLL) network 32, RF amplifier 34, and antenna 36. A pair of cables or conductors 38 and 40 having respective jacks 42, 44 extending from the cradle housing of the audio link 14 is connected to the conductors 26, 28 via the corresponding left and right audio output/headphones jacks 46, 48 of the MP3 player.

In addition to receiving the stereo left and right analog outputs via the respective jacks 42, 44, the FM stereo multiplexer 30 receives on line 50 a 38 kHz carrier used to modulate a left-minus-right (L-R) signal information which is then centered at 38 kHz and receives on line 52 a pilot tone located at 19 kHz. The FM stereo multiplexer 30 generates a composite multiplexed audio signal on its output line 54.

The PLL network 32 includes a loop filter 56 whose output on line 57 is fed to a first input of a summing circuit 58. The summing circuit 58 receives as a second input the composite multiplexed audio signal on the line 54 from the FM multiplexer 30. The output on line 60 of the summing circuit 58 is passed to a voltage-controlled oscillator (VCO) 62. The output of the VCO on line 64 is passed through a digital/frequency divider 66 and a phase (frequency) detector 68 to the input of the loop filter 56. The ratio of the digital/frequency divider 66 serves to adjust the transmission frequency of the FM transmitter in order to select a station channel. The phase detector 68 also receives a reference clock as a second input on line 69. The output of the VCO 62 is also fed to the RF amplifier 34 where the signal on the output thereof is transmitted via the antenna 36.

The transmitted signal is then received by the audio receiver system 16 via an antenna 17. The audio receiver 16 consists of a FM stereo receiver 19 which may be located in an in-house stereo receiver system, an in-car mounted FM radio receiver or the like. The radio receiver 19 is provided with stereo left and right channel speakers 70 and 72, respectively. The FM transmitted signals on the RF carrier signal are received by the FM stereo receiver 19 via the antenna 17 where the audio signals are demodulated and broadcasted over the automobile's stereo receiver 19.

Since all of the various electrical components in the cradle housing of the audio link 14 are quite large, they occupy a relatively large amount of space. This is due to the fact that the composite stereo signal is being generated in an analog format. Accordingly, it would therefore be desirable to generate the composite stereo audio signal in an entirely digital manner. This is advantageous since the digital processing circuitry can be fabricated with smaller integrated circuit chip (s), thereby reducing cost and space requirements.

The inventor of the present invention has developed a way of transmitting the composite stereo audio signal in a digital format so as to reduce the size of the electrical components and to obtain a higher audio quality than the audio system utilizing the analog format. These advantages are achieved through the provision of a wireless digital interface circuitry which is integrally mounted directly within the portable audio player. The wireless digital audio interface circuitry serves to replace the electrical components in the audio link 14 of FIG. 1. Further, the antenna 36 from the audio link 14 is also integrated into the portable audio player so as to provide a very compact size.

Another disadvantage in using the wireless audio link 14 is that the interface to the audio player 12 is still only through a small display located on the audio player 12. Since most new sound systems in automobiles today support radio data signals (RDS), the inventor has proposed to digitally multiplex the RDS data centered about a 57 kHz suppressed carrier along with the stereo analog signals. As a consequence, song data (artist name and song being played), radio station and call name, or any other interface data used by the portable audio player can be now viewed on a larger display located on the automobile's radio receiver.

SUMMARY OF THE INVENTION

Accordingly, it is a general object of the present invention to provide an improved FM output portable audio player which overcomes all of the disadvantages of the prior art.

It is an object of the present invention to provide an improved FM output portable audio player for digitally coupling audio signals generated therein to be broadcasted through an automobile's radio receiver system.

It is another object of the present invention to provide an improved FM output portable music player with RDS capability.

It is still another object of the present invention to provide wireless digital audio interface circuitry which is integrally mounted directly within a FM output portable audio player.

In a preferred embodiment of the present invention, there is provided a FM output portable audio player for digitally coupling audio signals generated therein to be broadcast through an automobile's radio receiver system. The audio player includes an audio signal source for generating digital audio output signals. Digital audio interface circuitry is coupled directly to the digital audio output signals and includes a digital FM stereo/RDS multiplexer for modulating the digital audio output signals on a RF carrier to produce a modulated audio signal. An internal antenna is coupled to the digital FM stereo/RDS multiplexer for wirelessly transmitting the modulated signal to an automobile's radio receiver system.

The digital audio interface circuitry is formed of integrated circuit chips which provides for lower cost, a compact size, and a higher audio quality. A radio data signal is also multiplexed by the digital FM stereo/RDS multiplexer to generate the modulated signal having the radio data signal centered about a 57 kHz suppressed carrier.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENTS

Figure 1:
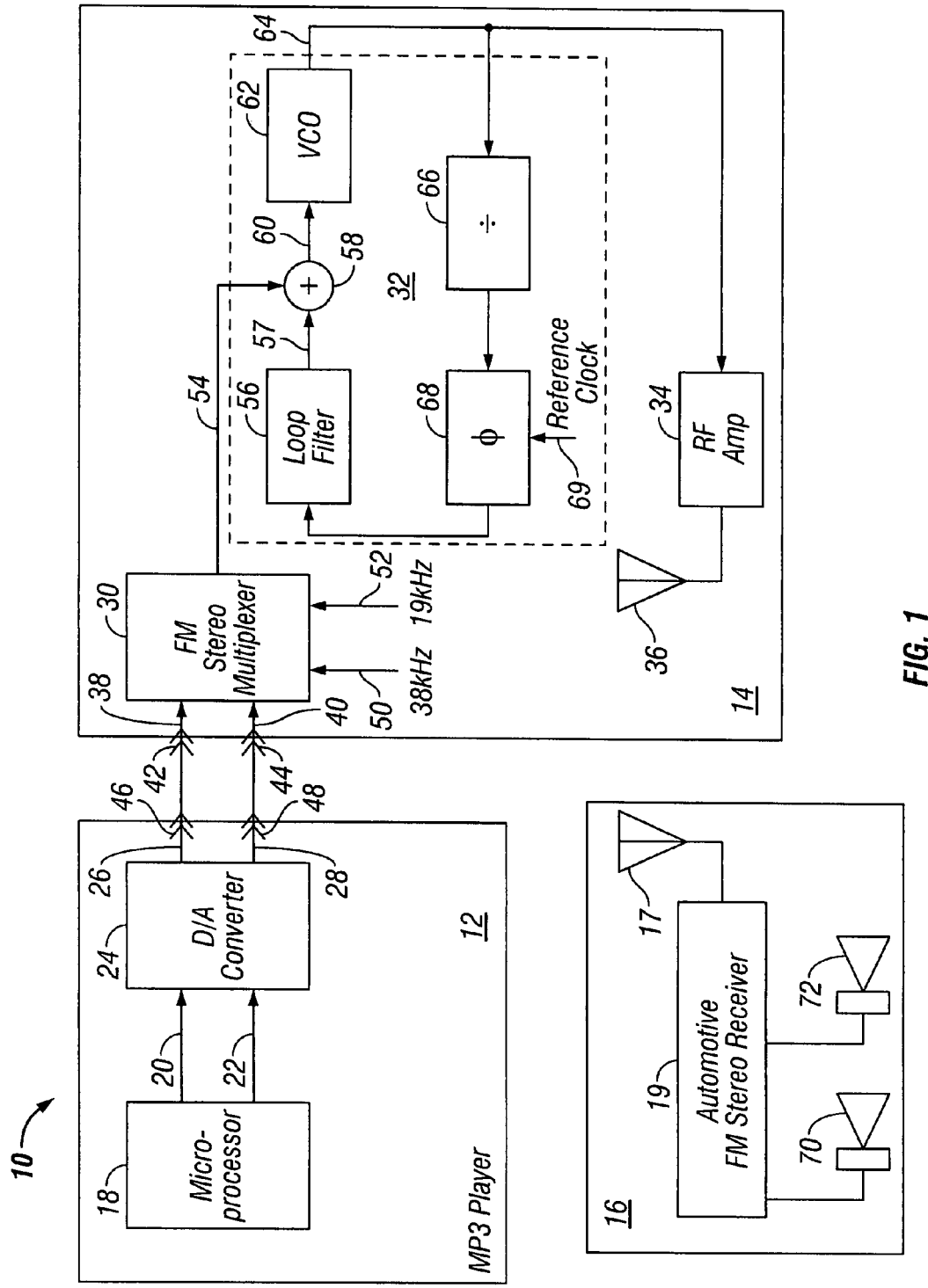
FIG. 1 is a general block diagram of a conventional audio system 10 consisting of a portable audio player, a wireless audio link, and an automobile radio receiver system, which has been labeled "Prior Art"

It is to be distinctly understood at the outset that the present invention shown in the drawings and described in detail in conjunction with the preferred embodiments is not intended to serve as a limitation upon the scope or teachings thereof, but is to be considered merely as an exemplification of the principles of the present invention.

Figure 2:
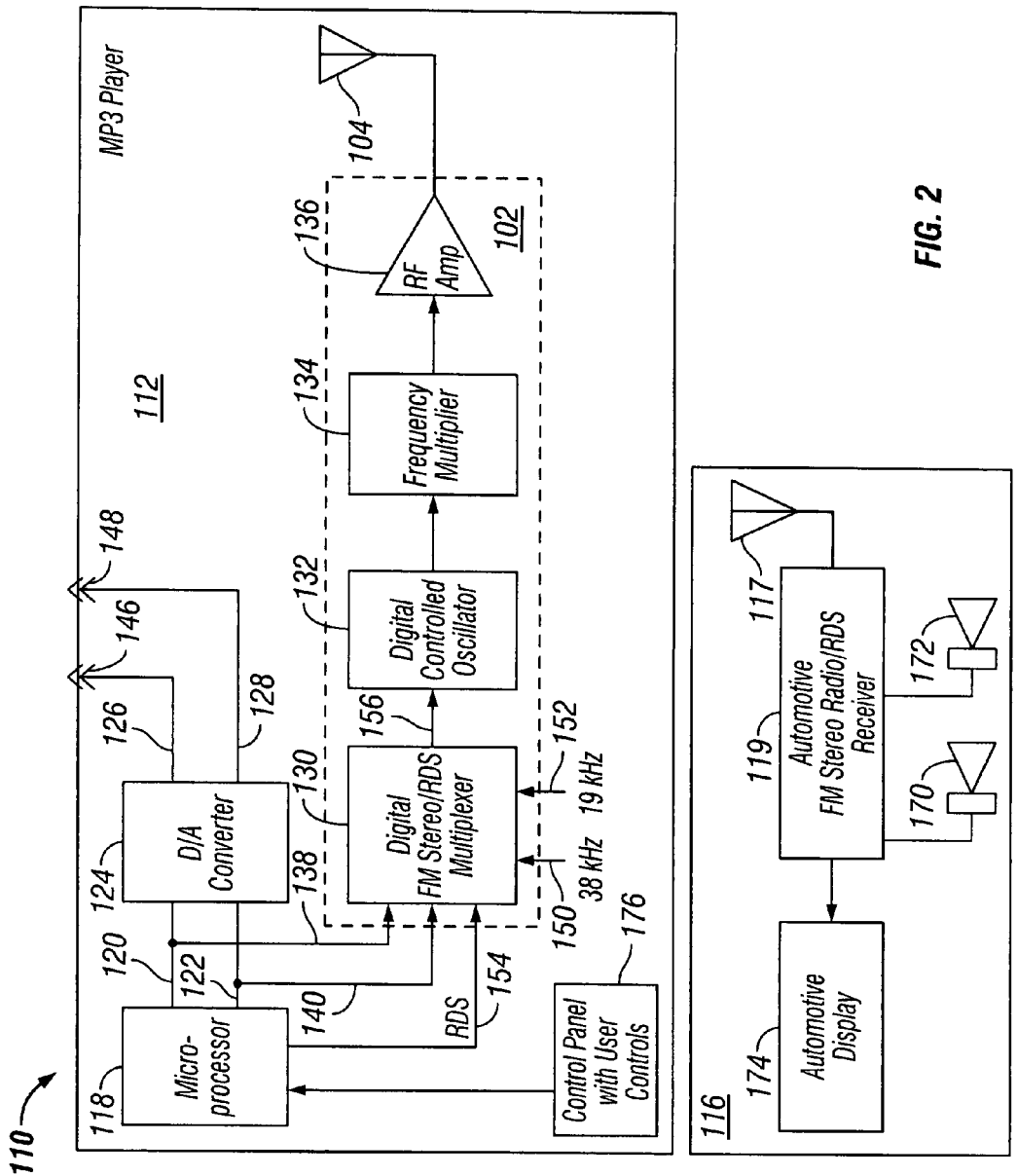
FIG. 2 is a general block diagram of an improved audio system 110 consisting of an improved FM output portable music player and an automobile radio receiver system, constructed in accordance with the principles of the present invention.

Referring now in detail to FIG. 2 of the drawings, there is depicted an improved audio system 110, constructed in accordance with the principles of the present invention. The audio system 110 includes a portable audio player 112 and a remote audio receiver system 116. The portable audio player 112 may be in the form of a CD, MP3, DVD player or the like carrying a digital audio storage media which is capable of generating stereo audio signals.

In particular, the MP3 player 112 includes an audio signal source, such as a microprocessor 118, for generating input digital audio signals on lines 120 and 122 and a digital-to-analog (D/A) converter 124 responsive to the digital signals for providing stereo left and right analog outputs on respective conductors 126 and 128. The conductors 126 and 128 are connected to the corresponding left and right audio output/headphone jacks 146, 148 of the MP3 player 112.

In addition to the microprocessor 118 and the D/A converter 124, the portable audio player 112 of the present invention includes wireless digital audio interface circuitry 102 which is integrally formed directly within the portable audio player 112. The interface circuitry 102 defining a FM transmitter is electrically connected to an internal antenna 104 for wirelessly transmitting the audio signals on a RF carrier signal less than ten meters to the remote automobile receiver system 116.

The wireless digital audio interface circuitry 102 includes a digital FM stereo/RDS multiplexer 130, a digital controlled oscillator (DCO) 132, a frequency multiplier 134, and a RF amplifier 136. The digital FM multiplexer 130 receives the stereo left and right digital outputs via respective lines 138 and 140 coupled to the corresponding lines 120 and 122 from the microprocessor 118. Further, the digital FM stereo/RDS multiplexer 130 receives on line 150 a 38 kHz carrier utilized to modulate a left-minus-right (L-R) signal information which is then centered at 38 kHz and receives on line 152 a pilot tone located at 19 kHz. Alternately, the left-minus-right (L-R) signal information and pilot tone may be generated internally in the FM multiplexer 130 rather than being supplied externally. The digital controlled oscillator 132 may be implemented as shown in FIG. 2 of U.S. Pat. No. 7,092,476 to John L. Melanson and issued on Aug. 15, 2006. This '476 patent is hereby incorporated by reference.

In addition, digital-data signals in the form of radio data signals (RDS) are inputted on line 154 to the digital FM stereo/RDS modulator 130 from the microprocessor 118. The digital data is carried on a 57 kHz suppressed carrier that is in phase with the 19 kHz pilot carrier. Thus, the FM multiplexer 130 generates a composite audio signal on its output line 156 which is a standard composite stereo multiplexed signal wherein there is added a radio data signal centered about a 57 kHz suppressed carrier.

The output of the digital FM multiplexer 130 on the line 156 is then passed through the digital controlled oscillator 132 and the frequency multiplier 134 to the input of the RF amplifier 136. The output of the RF amplifier 136 is connected to the internal antenna 104 for transmitting the composite stereo multiplexed signal.

Since the composite stereo multiplexed signal is generated in an entirely digital manner, the digital processing circuitry (namely, FM multiplexer, DCO, frequency multiplier, and amplifier) can be fabricated with one or more smaller integrated circuit chips which reduces cost and occupies lesser amount of space than the audio system using the analog format. Further, the present audio system utilizing the digital format produces a higher audio quality and a better performance.

The transmitted composite stereo multiplexed signal is then received by the audio receiver system 116 via an antenna 117. The audio receiver system 116 consist of a FM stereo radio receiver and a radio data signal RDS receiver 119, which may be located in an in-house stereo receiver system, an in-car mounted FM radio receiver system or the like. The radio/RDS receiver 119 is provided with stereo left and right channel speakers 170 and 172, respectively. Accordingly, the FM transmitted signals on the RF carrier signal are received by the radio/RDS receiver 119 via the antenna 117 where the audio signals are demodulated and broadcasted over the automobile's radio/RDS receiver 119.

In addition, the RDS signal modulated on the 57 kHz carrier is also demodulated by the radio/RDS receiver 119 to retrieve the RDS data. The RDS data may include song data (artist name and name of song being played), radio station and call name, or any other interface data used by the portable audio player 112 can be now viewed on a larger display 174 located on the automobile's radio/RDS receiver 119. Further, the portable audio player includes a control panel 176 with user controls coupled to the FM transmitter which allows a user to interface with the audio player to enable the song data to be displayed on the larger display 174 located on the automobile's radio/RDS receiver 119. The digital FM stereo/RDS multiplexer 130 includes a RDS transmitter which is coupled to the control panel 176 for modulating the RDS signal on the 57 kHz carrier.

From the foregoing detailed description, it can thus be seen that the present invention provides a FM output portable audio player for digitally coupling audio signals generated therein to be broadcast through an automobile's radio receiver system. The audio player includes an audio signal source for generating digital audio output signals. Digital audio interface circuitry is coupled directly to the digital audio output signals and includes a digital FM stereo/RDS multiplexer for modulating the digital audio output signals on a RF carrier to produce a modulated audio signal. An internal antenna is coupled to the digital FM stereo/RDS multiplexer for wirelessly transmitting the modulated signal to an automobile's radio receiver system. The digital audio interface circuitry is formed of integrated circuit chips which provides for lower cost, a compact size, and a higher audio quality. A radio data signal is also multiplexed by the digital FM stereo/RDS multiplexer to generate the modulated signal having the radio data signal centered about a 57 kHz suppressed carrier.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

The invention claimed is:

1. A FM output portable audio player for digitally coupling audio signals generated therein to be broadcast through a radio receiver system, said portable audio player comprising:
    an audio signal source for generating digital audio output signals;
    digital audio interface circuitry coupled directly to said digital audio output signals and including a digital FM stereo/RDS multiplexer for modulating said digital audio output signals on a RF carrier to produce a modulated audio signal;
    an internal antenna being coupled to said digital FM stereo/RDS multiplexer;
    said portable audio player being capable of wirelessly transmitting said modulated signal to a radio receiver system; and
    said digital audio interface circuitry further including a digital controlled oscillator coupled to said digital FM stereo/RDS multiplexer for receiving said modulated signal.

2. A FM output portable audio player as claimed in claim 1, wherein said audio signal source for generating said digital audio output signals includes a microprocessor.

3. A FM output portable audio player as claimed in claim 1, wherein said digital audio interface circuitry further comprises a frequency multiplier having its input coupled to said digital controlled oscillator and having its output coupled to an input of a RF amplifier.

4. A FM output portable audio player as claimed in claim 3, wherein said RF amplifier has its output coupled to said internal antenna for wirelessly transmitting said modulated signal.

5. A FM output portable audio player as claimed in claim 1, further comprising a radio data signal being multiplexed by said digital FM stereo/RDS multiplexer to generate said modulated signal having FM stereo audio signals and the radio data signal centered about a 57 kHz suppressed carrier.

6. A FM output portable audio player as claimed in claim 5, wherein said portable audio player is capable of wirelessly transmitting to said radio receiver system that includes a radio/RDS receiver for demodulating said FM stereo audio signals to produce an audio output and for recovering said radio data signal.

7. A FM output portable audio player as claimed in claim 6, wherein said portable audio player is capable of wirelessly transmitting to said radio/RDS receiver that includes a display for viewing said radio data signal.

8. A FM output portable audio player as claimed in claim 7, wherein said portable audio player is capable of wirelessly transmitting said radio data signal contains song data including an artist name and a name of a song being played.

9. A FM portable audio player as claimed in claim 1, wherein said radio receiver system is an automobile radio receiver system.

10. A FM output portable audio player as claimed in claim 9, wherein said portable audio player is capable of wirelessly transmitting to said automobile radio receiver system that includes a radio/RDS receiver for demodulating said FM stereo audio signals to produce an audio output and for recovering said radio data signal.

11. A FM output portable audio player as claimed in claim 10, wherein said portable audio player is capable of wirelessly transmitting to said radio/RDS receiver that includes a display for viewing said radio data signal.

12. A FM output portable audio player as claimed in claim 11, wherein said portable audio player is capable of wirelessly transmitting said radio data signal contains song data including an artist's name and a name of a song being played.

13. A FM output portable audio player for digitally coupling audio signals generated therein to be broadcast through a radio receiver system, said portable audio player comprising:
    means for generating digital audio output signals;
    digital audio interface circuit means coupled directly to said digital audio output signals and including digital FM stereo/RDS multiplexer means for modulating said digital audio output signals on a RF carrier to produce a modulated audio signal;
    an internal antenna being coupled to said digital FM stereo/RDS multiplexer means;
    said portable audio player being capable of wirelessly transmitting said modulated signal to a radio receiver; and
    said means for generating said digital audio output signals including a microprocessor; and
    said digital audio interface circuit means further including digital controlled oscillator means coupled to said digital FM stereo/RDS multiplexer for receiving said modulated signal.

14. A FM output portable audio player as claimed in claim 13, wherein said digital audio interface circuit means further comprises frequency multiplier means having its input coupled to said digital controlled oscillator means and having its output coupled to an input of RF amplifier means.

15. A FM output portable audio player as claimed in claim 14, wherein said RF amplifier means has its output coupled to said internal antenna for wirelessly transmitting said modulated signal.

16. A FM output portable audio player as claimed in claim 13, further comprising a radio data signal being multiplexed by said digital FM stereo/RDS multiplexer means to generate said modulated signal having FM stereo audio signals and the radio data signal centered about a 57 kHz suppressed carrier.

17. A FM output portable audio player as claimed in claim 16, wherein said portable audio player is capable of wirelessly transmitting said modulated signal to said radio receiver system that includes a radio/RDS receiver having a display for viewing said radio data signal.

18. A FM portable audio player as claimed in claim 13, wherein said radio receiver system is an automobile radio receiver system.

\* \* \* \* \*